March 14, 1944.  F. J. McNULTY  2,344,362
PNEUMATIC TIRE VEHICLE WHEEL
Filed Dec. 17, 1942  2 Sheets-Sheet 1
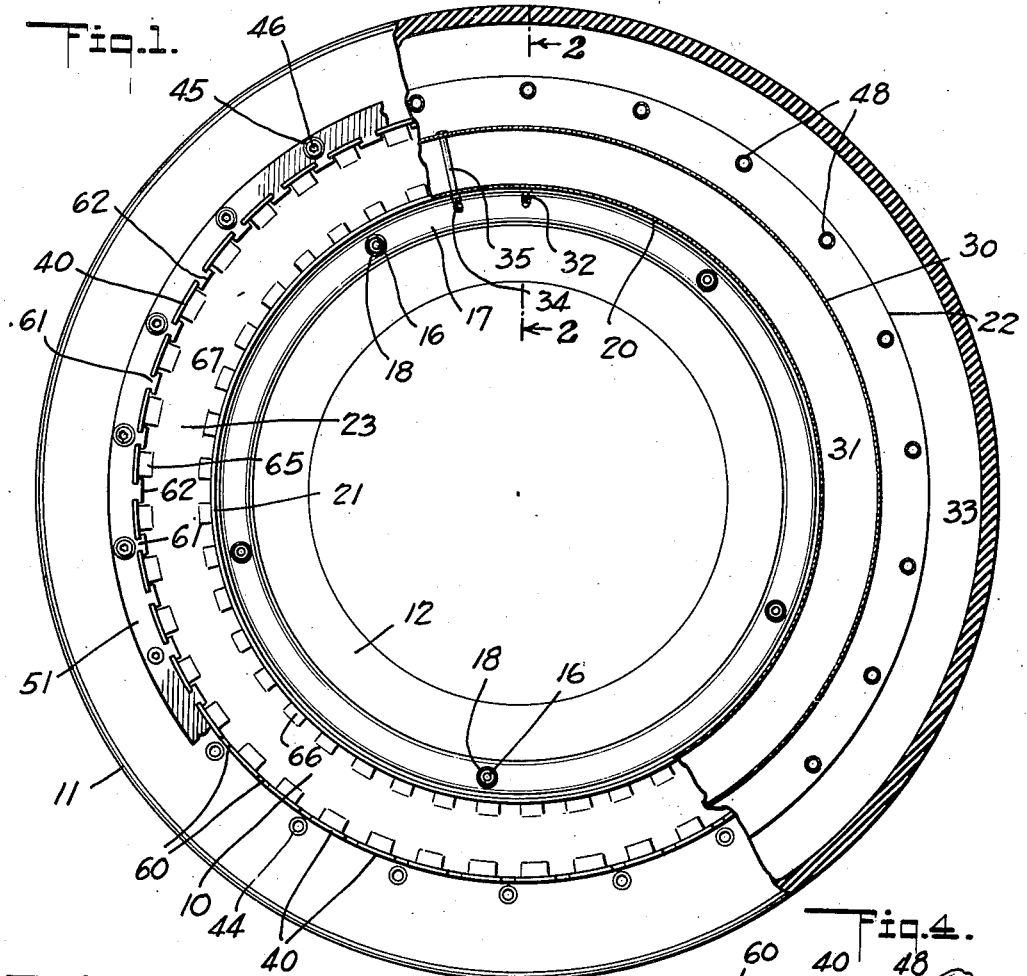
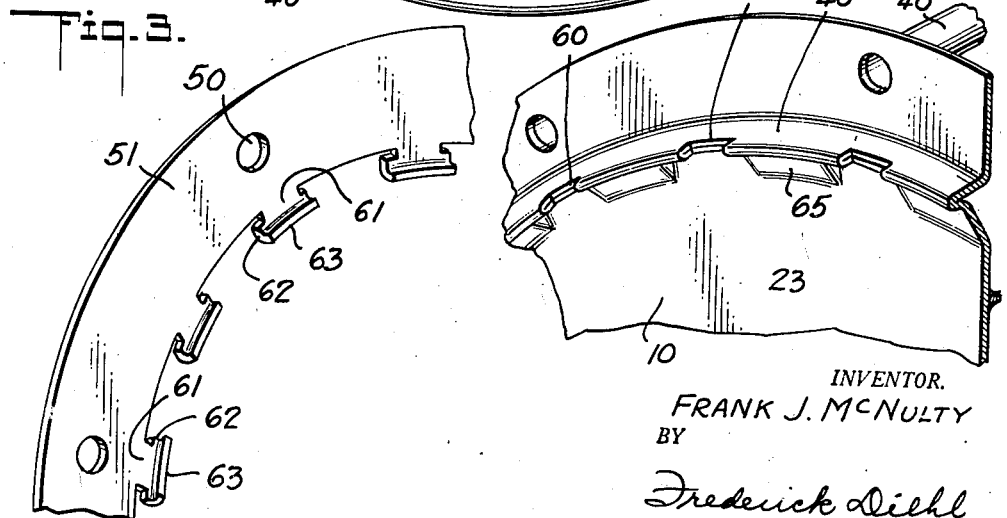
INVENTOR.
FRANK J. McNULTY
BY
Frederick Diehl
ATTORNEY March 14, 1944.  F. J. McNULTY  2,344,362
PNEUMATIC TIRE VEHICLE WHEEL
Filed Dec. 17, 1942  2 Sheets-Sheet 2

INVENTOR.
FRANK J. McNULTY
BY
Frederick Diehl
ATTORNEY

Patented Mar. 14, 1944

2,344,362

UNITED STATES PATENT OFFICE 2,344,362

PNEUMATIC TIRE VEHICLE WHEEL

Frank J. McNulty, Los Angeles, Calif., assignor of forty per cent to Marguerite Talbot, Macon, Mo.

Application December 17, 1942, Serial No. 469,313

1 Claim. (Cl. 152—398)

This invention relates generally to vehicles and more particularly to vehicle wheels of the pneumatic tire type.

An object of this invention is to provide a vehicle wheel which is constructed to include a fluid-tight chamber for storing a reserve supply of air under pressure to replenish the supply of air in the pneumatic tire on the wheel, to compensate for the loss of air from the tire, all in such manner that inflation of the tire to its normal operating pressure can be simply and conveniently accomplished from the reserve supply of air in the wheel should the tire become partially or completely deflated, whereby to greatly facilitate the proper upkeep of the tire and the reinflation thereof, particularly should a serious loss of air occur in a remote or inaccessible location.

Another object of the invention is to provide a vehicle wheel of the above described character, the body of which is constructed to form the storage chamber for reserve high pressure air, and a space with which a tire casing co-acts to form a second chamber adapted to receive air under pressure to inflate the tire casing directly, so as to dispense with the use of a tube, all to the end of simplifying the construction of the wheel and tire with the added advantage of a reserve supply of air conveniently available for use at any time.

A further object of the invention is to provide a vehicle wheel having a tubeless pneumatic tire of generally U-shaped cross section whose side wall forming portions are detachably secured and safely locked to the side walls of the wheel body in fluid sealed relation thereto by co-acting means on the wheel body and on retaining ring members, to form a flexible walled pneumatic chamber which is supplied with air to inflate the tire to the desired pressure.

With these and other objects in view, the invention resides in the combinations and arrangements of elements as set forth in the following specification and particularly pointed out in the appended claim.

In the accompanying drawings,

Figure 1 is a view of the pneumatic tire vehicle wheel in side elevation partly broken away and partly in section to illustrate the construction at different planes;

Figure 3 is a fragmentary perspective view of a retaining ring member embodied in the invention;

Figure 4 is a fragmentary perspective view illustrating a portion of the body of the wheel with which the retaining ring member co-acts;

Figure 2:
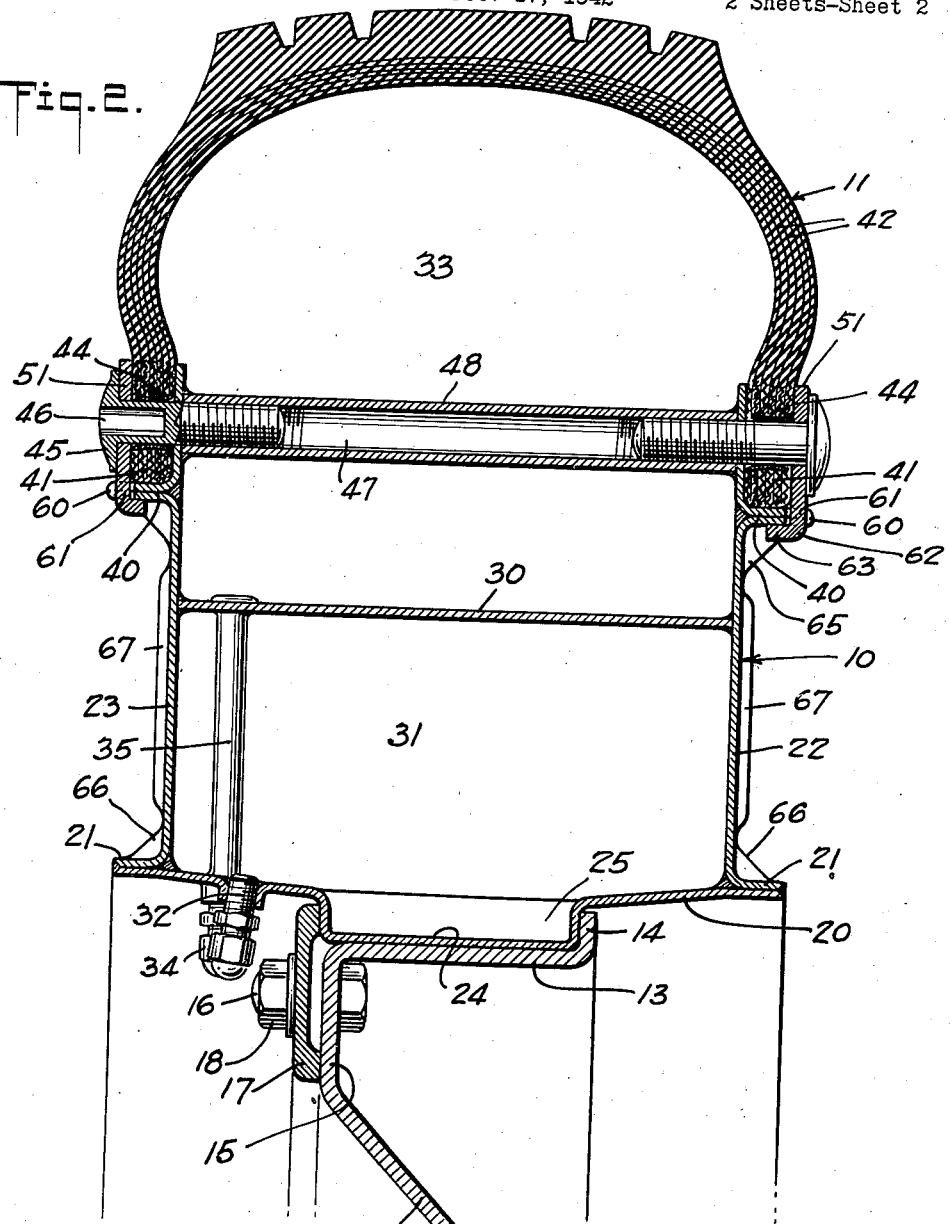
Figure 2 is an enlarged transverse sectional view taken on the line 2—2 of Figure 1.
Figure 5:
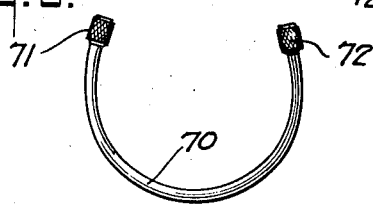
Figure 5 is a view in side elevation, of an air transferring hose which may be employed in the use of the invention.

Referring specifically to the drawings, the invention in its present embodiment comprises a body and a tire casing designated generally at 10 and 11 respectively. The body is demountably supported on a hub member 12 which latter can be of any suitable construction so long as it provides a rim portion 13 having an annular stop flange 14 projecting radially outward, and an annular attaching flange 15 provided with a circular series of fastening members such as stud bolts 16 for co-action with a retaining ring 17 and a series of nuts on the bolts, designated at 18, all to the end of demountably supporting the body 10 on the hub member.

The body 10 is preferably constructed of sheet metal to provide an annular rim 20 to the free edge portions of which are welded or otherwise secured the flanges 21 of inner and outer side walls 22 and 23 respectively, projecting radially outward in parallelism. The rim 20 has a drop center portion 24 which slidably fits upon the rim portion 13 of the hub member 12 and is clamped by the retaining ring 17 between the latter and the stop flange 14 of the hub member, all as clearly shown in Figure 2. Cross braces 25 are welded transversely across the drop center portion 24 at locations corresponding to the bolts 16 so as to effectively reinforce the drop center portion against the clamping pressure imposed thereon by the retaining ring 17.

An annular partition 30 is welded or otherwise secured to the side walls 22 and 23 in spaced concentric relation to the rim 20 to define a sealed annular chamber 31 in which a reserve supply of air under pressure is stored, and can be supplied through a conventional valve 32 of the type at present employed on tire tubes. The partition 30 also co-acts with the casing 11 to define an inflatable chamber 33 of which the casing 11 forms a flexible wall. Air can be supplied to the chamber 33 through a valve 34 similar to the valve 32 and communicating with the chamber 33 through a pipe 35 located in the body 10 adjacent the valve 32 as shown in Figure 1.

Adjacent their peripheral portions which form attaching portions for the tire casing, the side walls 22 and 23 are provided with laterally projecting flanges 40 against which the wire mesh reinforced bead portions 41 of the casing 11 seat in the applied position of the casing. The casing is generally U-shaped in cross section with suitable spring steel band strips or wires 42 imbedded in the rubber and fabric side walls and in the tread portion of the casing as shown in Figure 2, so as to adequately reinforce the casing The bead portions 41 of the casing are further reinforced by metal ferrules 44 imbedded therein and forming openings in the bead portions, through which safety type round headed screws 45, having wrench receiving sockets 46 are extended and are screwed into threaded portions of the bores 47 of rigid spacer tubes 48 spanning and welded to the side walls 22 and 23 at the circumferentially spaced intervals shown in Figure 1.

The screws 45 pass freely through openings 50 in the removable locking rings 51 applied at the outer sides of the bead portions 41 for co-action with the screws 45 when tightened, to clamp the bead portions between the locking rings and the respective side walls 22 and 23 with fluid-tight joints therebetween.

The lateral flanges 40 of the side walls 22 and 23 are provided with recesses 60 which receive neck portions 61 of locking lugs 62 on the locking rings 51. The locking lugs 62 terminate in laterally bent locking hooks 63 which hook around the lateral flanges 40 at opposite ends of the recesses 60 in the latter, to thus rigidly secure the locking rings against radial and circumferential displacement.

The side walls 22 and 23 are provided with pressed gussets 65 and 66 to reinforce them, and are adapted to be employed as display surfaces for various ornamental designs and colored decorative effects which can also be applied to the side walls of the tire casing.

In the operation of the invention, compressed air is supplied from a suitable source, to the chamber 33 to inflate the casing 11 to the desired pressure for the proper resilient support of the vehicle, by applying the nozzle of the usual air hose to the stem of the valve 34. Air is also supplied to the storage chamber 31 through the valve 32 until at least twice the amount of air necessary to completely resupply the chamber 33 is contained in the storage chamber. Compressed air stored in the chamber 31 is thus always available, and is transferrable to the chamber 33 after suitable repair or substitution of the casing 11 has been made, by utilizing a short length of flexible hose 70 having nozzles 71 and 72 at its ends provided with the usual valve unseating means to automatically open the valves 32 and 34 when the nozzles are screwed onto the stems of the valves, as will be clear to those familiar with the art.

I claim:

A vehicle wheel comprising: a body having a rim portion adapted to be mounted on a hub member, and spaced side walls projecting from the rim portion; the body having rigid spacers spanning said side walls at circumferentially spaced intervals; a tire casing having bead portions; locking rings; threaded fastening members extending through said locking rings and bead portions and screwed into said spacers to clamp the bead portions to the body and define a chamber adapted to receive air under pressure to directly inflate the casing; said side walls having laterally outward projecting flanges provided with recesses; said locking rings having lugs provided with neck portions entering said recesses, and hooks projecting from the neck portions in hooked engagement with said flanges; and valve means through which air is supplied to said chamber.

FRANK J. McNULTY.